(12) United States Patent
Odagiri et al.

(10) Patent No.: US 8,215,195 B2
(45) Date of Patent: Jul. 10, 2012

(54) ENGINE STARTER

(75) Inventors: Masataka Odagiri, Midori (JP);
Tomohiko Ikemori, Kiryu (JP); Hitoshi Ono, Kiryu (JP); Yoshikazu Sato, Fukaya (JP); Hiroshi Ooka, Kiryu (JP); Shigeyuki Enkaku, Kinyu (JP)

(73) Assignee: Mitsuba Corporation, Kiryu-Shi (JP)

( * ) Notice: Subject to any disclaimer, the term of this patent is extended or adjusted under 35 U.S.C. 154(b) by 596 days.

(21) Appl. No.: 12/382,394

(22) Filed: Mar. 16, 2009

(65) Prior Publication Data

US 2009/0250942 A1 Oct. 8, 2009

(30) Foreign Application Priority Data

| Mar. 18, 2008 | (JP) | 2008-068739 |
| Mar. 18, 2008 | (JP) | 2008-068740 |
| Sep. 9, 2008 | (JP) | 2008-230942 |
| Oct. 9, 2008 | (JP) | 2008-262380 |
| Mar. 16, 2009 | (JP) | 2009-062241 |

(51) Int. Cl.
*F02N 15/06* (2006.01)
*F02N 15/00* (2006.01)
*F02N 15/02* (2006.01)

(52) U.S. Cl. .............................. 74/7 R; 74/6

(58) Field of Classification Search ........... 74/6, 7 A, 74/7 R
See application file for complete search history.

(56) References Cited

U.S. PATENT DOCUMENTS

| 5,196,727 | A | * | 3/1993 | Isozumi et al. | 290/48 |
| 5,901,604 | A | * | 5/1999 | Sato et al. | 74/7 A |
| 6,268,670 | B1 | * | 7/2001 | Kuragaki et al. | 310/75 R |
| 6,286,378 | B1 | * | 9/2001 | Kamei et al. | 74/7 A |
| 6,382,037 | B1 | * | 5/2002 | Kobayashi et al. | 74/7 A |

FOREIGN PATENT DOCUMENTS

JP A-2007-71043 3/2007

* cited by examiner

*Primary Examiner* — Justin Krause
(74) *Attorney, Agent, or Firm* — Oliff & Berridge, PLC

(57) ABSTRACT

An electromagnetic controller includes an exciting coil unit that is provided with a coil main body and an exciting piece that is positioned at a tip end side of the coil main body so as to be magnetized according to an excitation of the coil main body; and a plunger that is disposed in a ring-shaped space formed at an inner diameter side of the exciting coil unit so as to be movable in the ring-shaped space in an axial center direction, the plunger being displaceable from a non-acting position to an acting position at a tip end side under an attracting force based on magnetization of the exciting piece, wherein an urging member is provided at the inner diameter side of the exciting coil unit so as to urge the plunger to a side of the non-acting position according to demagnetization of the exciting piece.

4 Claims, 13 Drawing Sheets

FIG.11A
FIG.11B
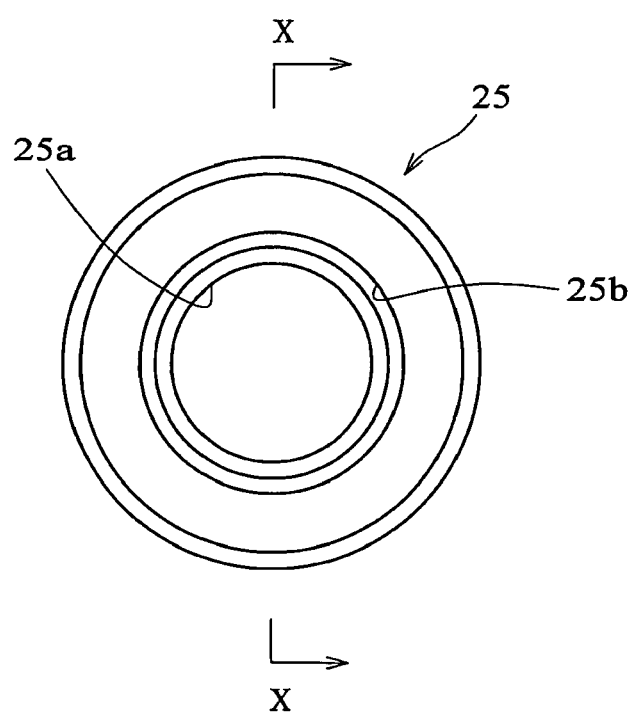
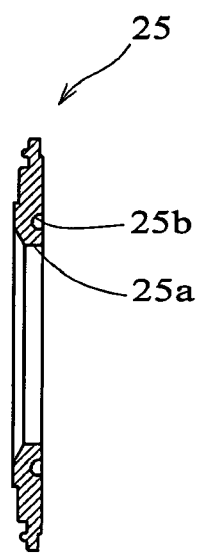

ENGINE STARTER

CROSS-REFERENCE TO RELATED APPLICATIONS

This application claims priority from Japanese Patent Application No. 2008-068739, filed Mar. 18, 2008, Japanese Patent Application No. 2008-068740, filed Mar. 18, 2008, Japanese Patent Application No. 2008-230942, filed Sep. 9, 2008, Japanese Patent Application No. 2008-262380, filed Oct. 9, 2008, and Japanese Patent Application No. 2009-062241, filed Mar. 16, 2009, the entire disclosures of which are incorporated herein by reference hereto.

BACKGROUND

The present invention relates to an engine starter.

There exists an engine starter that includes a motor unit; a drive shaft that rotates by being subjected to a driving force of the motor unit; a pinion gear that spline-fits to the drive shaft; and an electromagnetic controller that connects the motor unit with a battery and allows the pinion gear to be engaged with a ring gear at an engine side by displacing the pinion gear toward a tip end side (see, for example, Japanese Published Unexamined Patent Application No. 2007-71043). The motor shaft of the motor unit and the drive shaft are disposed concentrically such that the engine starter is radially downsized. In this configuration, the electromagnetic controller can include an exciting coil unit. The exciting coil unit is disposed on an inner peripheral surface of a cylindrical case body for covering the pinion gear. The exciting coil unit includes a coil main body; and an exciting piece that is positioned at a tip end side of the coil main body so as to be magnetized according to an excitation of the coil main body. The electromagnetic controller can also include a plunger that is disposed so as be movable in an axial center direction in a ring-shaped space that is formed on an inner diameter side of the exciting coil unit. The plunger carries out operations for connecting the motor unit with the battery and pushing the pinion gear out when the plunger is displaced from an non-acting position to an acting position under an attracting force based on magnetization of the exciting piece. However, there exists a problem in that a plunger displacement stroke needs to correspond with a longer operation stroke because operation strokes of each of the operations are different.

In order to solve the problem, the plunger is provided with a first plunger on an outer diameter side and a second plunger on the inner diameter side. The first and second plungers are layered radially on the drive shaft and movable relative to each other in the axial center direction. The first and second plungers are also displaceable individually by excitation of the exciting piece. As a result, displacement of the first plunger to an acting position from a non-acting position causes the motor unit to be conductive to the battery, whereas displacement of the second plunger to an acting position from a non-acting position causes the pinion gear to be pushed out. Thus, each of the operation strokes is suitable for their own operations.

SUMMARY

The electromagnetic controller needs return structure in order to return the first and second plungers from the acting positions to the non-acting positions when the exciting piece is not excited. In the above-described conventional configuration, as a return structure of the first plunger, spring bearing pieces are formed at a plurality of positions in a circumferential direction so as to project toward an outer diameter side from a cylindrical plunger main body. The spring bearing pieces are opposed to a plurality of spring housings that are formed at a cylinder opening end of the gear cover opposite to the spring bearing pieces for respectively housing compression coils. In order to secure a necessary urging force toward the non-acting position, however, the first plunger is urged to the non-acting position side even if the exciting coil unit is in a non-exciting state. Accordingly, the first plunger needs to be incorporated into the gear cover while the spring bearing pieces of the first plunger are pressed against the spring housings against respective compression springs. The first plunger is thus unstable because the positions at which the return structure are disposed are on an outer diameter side portion of the first plunger. As a result, smooth displacement of the first plunger may be lost. In addition, it is troublesome, complicated and difficult uniformly pressing and incorporating the first plunger into the gear cover because the return structure is provided at a plurality of positions in the circumferential direction. Further, the engine starter is prone to be larger in size because the plurality of the spring bearing pieces are formed on the first plunger and the plurality of spring housings are formed on the gear cover. Furthermore, pressing forces of the compression springs toward a side of the non-acting position act on the spring bearing pieces that projects toward the outer diameter side of the first plunger while the pressing forces are dispersed in a circumferential direction of the first plunger. If the pressing forces of the compression springs vary, the varied urging forces vary further while acting on the first plunger. As a result, smooth displacement of the first plunger may be lost further. The present invention solves the problems, and is able to achieve various other advantages.

The disclosure according to a first exemplary aspect provides an engine starter that comprises a motor unit; a drive shaft that rotates under a motor unit driving force; a pinion gear that spline-fits to the drive shaft; and an electromagnetic controller that is fit onto the drive shaft, connects the motor unit with a battery power supply, and allows the pinion gear to be displaced toward a tip end side so as to be engaged with a ring gear at an engine side. The electromagnetic controller comprises an exciting coil unit that is provided with a coil main body and an exciting piece that is positioned at a tip end side of the coil main body so as to be magnetized according to an excitation of the coil main body; and a plunger that is disposed in a ring-shaped space formed at an inner diameter side of the exciting coil unit so as to be movable in the ring-shaped space in an axial center direction and displaced from a non-acting position to an acting position at a tip end side under an attracting force based on magnetization of the exciting piece. An urging member is provided at the inner diameter side of the exciting coil unit so as to urge the plunger to a side of the non-acting position according to demagnetization of the exciting piece.

The disclosure according to a second exemplary aspect provides the engine starter according to the first exemplary aspect, wherein the urging member is provided so as to urge a tip end face of the plunger.

The disclosure according to a third exemplary aspect provides the engine starter according to the first or second exemplary aspect, wherein the urging member is formed to be a ring-shaped plate, and an urging part of the urging member at an inner diameter side urges a tip end face of the plunger and includes a pressing piece that is notched long at a plurality of positions in a circumferential direction and bent toward the plunger.

The disclosure according to a fourth exemplary aspect provides the engine starter according to any one of the first through third exemplary aspects, wherein the plunger comprises a first plunger unit that switches a connection between the motor unit and the battery power supply that is provided along an inner peripheral surface of the exciting coil unit; and a second plunger unit that is positioned at an inner diameter side of the first plunger unit and displaces the pinion gear. The urging member urges the first plunger unit at an outer diameter side toward the non-acting position. The exciting piece is formed to be a disk shape that projects toward the inner diameter side rather than the inner peripheral surface of the exciting coil unit. A second plunger main body is provided on the second plunger unit at an inner diameter side so as to be attracted by the exciting piece that is magnetized on an outer peripheral surface. A cylindrical part is formed so as to extend toward a tip end side of the exciting piece through a through hole of the exciting piece when the second plunger unit is displaced to the acting position. An intervening space between an outer peripheral surface of the cylindrical part of the second plunger unit at the acting position and the exciting piece through hole is narrower than an intervening space between a tip end surface of the first plunger unit and the urging part of the urging member that is layered on the exciting piece.

The disclosure according to a fifth exemplary aspect provides the engine starter according to any one of the first through fourth exemplary aspects, wherein the exciting piece includes a ring-shaped recessed groove that is positioned at a portion opposed to an urging part of the urging member.

The disclosure according to a sixth exemplary aspect provides the engine starter according to the fifth exemplary aspect, wherein the plunger comprises a first plunger unit that switches a connection between the motor unit and the battery power supply that is provided along an inner peripheral surface of the exciting coil unit; and a second plunger unit that is positioned at an inner diameter side of the first plunger unit and displaces the pinion gear. The urging member urges the first plunger unit at an outer diameter side toward the non-acting position. The exciting piece is formed to be a disk shape that projects toward the inner diameter side rather than the inner peripheral surface of the exciting coil unit. A second plunger main body is provided on the second plunger unit at an inner diameter side so as to be attracted by the exciting piece that is magnetized on an outer peripheral surface. A cylindrical part is formed so as to extend toward a tip end side of the exciting piece through a through hole of the exciting piece when the second plunger unit is displaced to the acting position. A groove depth and width of a recessed groove is greater than an intervening space between an outer peripheral surface of the cylindrical part of the second plunger unit at the acting position and the exciting piece through hole.

The disclosure according to a seventh exemplary aspect provides the engine starter according to the fifth or sixth exemplary aspect, wherein a groove edge of the recessed groove at an inner diameter side is opposed in an axial center direction with respect to an end edge portion of a pressing piece of the urging part at an inner diameter side, and the groove edge can abut against the pressing piece.

The disclosure according to an eighth exemplary aspect provides the engine starter according to any one of the fifth through seventh exemplary aspects, wherein the exciting piece includes a projection that is formed by press-working the recessed groove so as to project from a tip end side surface, and the projection functions as a positioning member for positioning with respect to a plate body that is disposed in a layered manner at the tip end side of the exciting piece.

According to the first exemplary aspect, an engine starter can be provided with high reliability in which the plunger can be displaced smoothly in a well balanced manner. The plunger can also be incorporated thereinto stably, simply and easily.

According to the second exemplary aspect, the plunger can be displaced smoothly and stably further.

According to the third exemplary aspect, the configuration can be simplified, and the incorporating performance can be improved.

According to the fourth exemplary aspect, even if a foreign matter is between the urging member and the exciting piece, the foreign matter neither deforms the urging part nor deteriorates the displacement of the plunger. Accordingly, the urging member can be protected.

According to the fifth and sixth exemplary aspect, even if a foreign matter is between the urging member and the exciting piece, the foreign matter neither deforms the urging part nor deteriorates the displacement of the plunger. Accordingly, the urging member can be protected.

According to the seventh exemplary aspect, the urging member can be prevented from being impaired in function.

According to the eighth exemplary aspect, the exciting coil unit can be incorporated accurately.

BRIEF DESCRIPTION OF THE DRAWINGS

Various exemplary aspects will be described with reference to the drawings, wherein:

FIG. 11A is a side view of a clutch stopper of the second embodiment, and

FIG. 11B is a sectional view along X-X of FIG. 11A;

DETAILED DESCRIPTION OF EMBODIMENTS

A first embodiment of the present invention will be described with reference to the drawings.

Figure 1A:
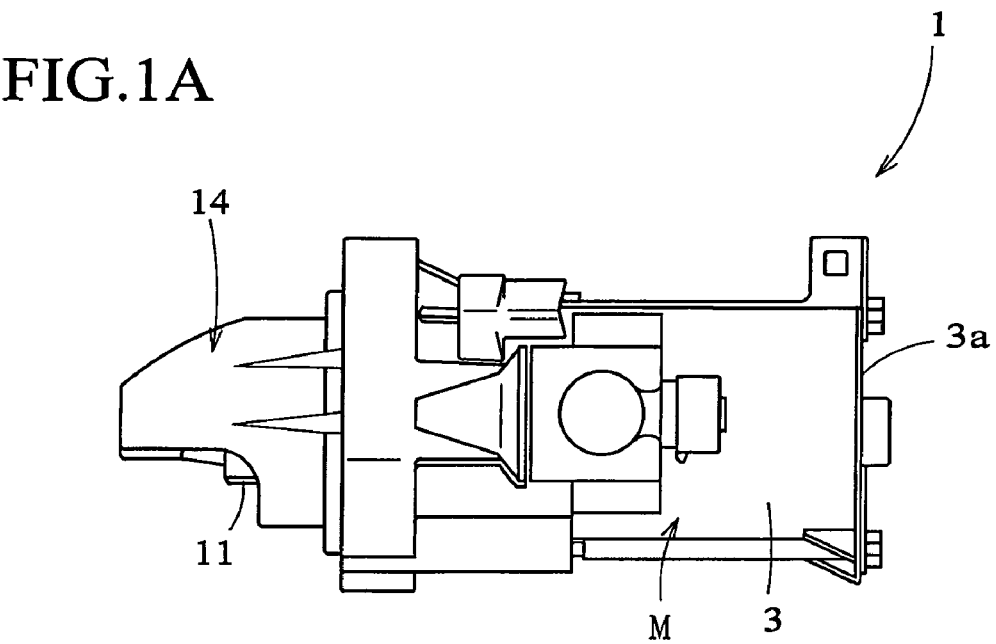
FIGS. 1A and 1B are a front view and a bottom view of an engine starter, respectively.
Figure 1B:
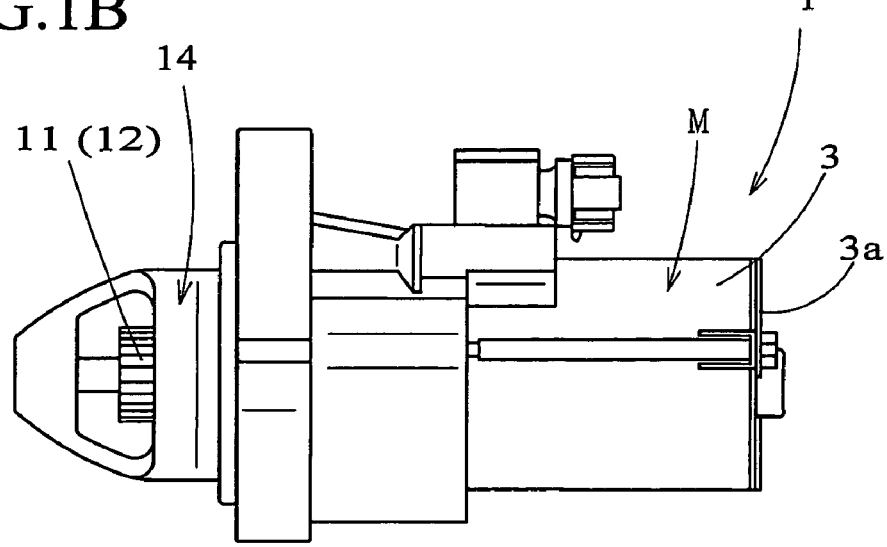
Figure 2:
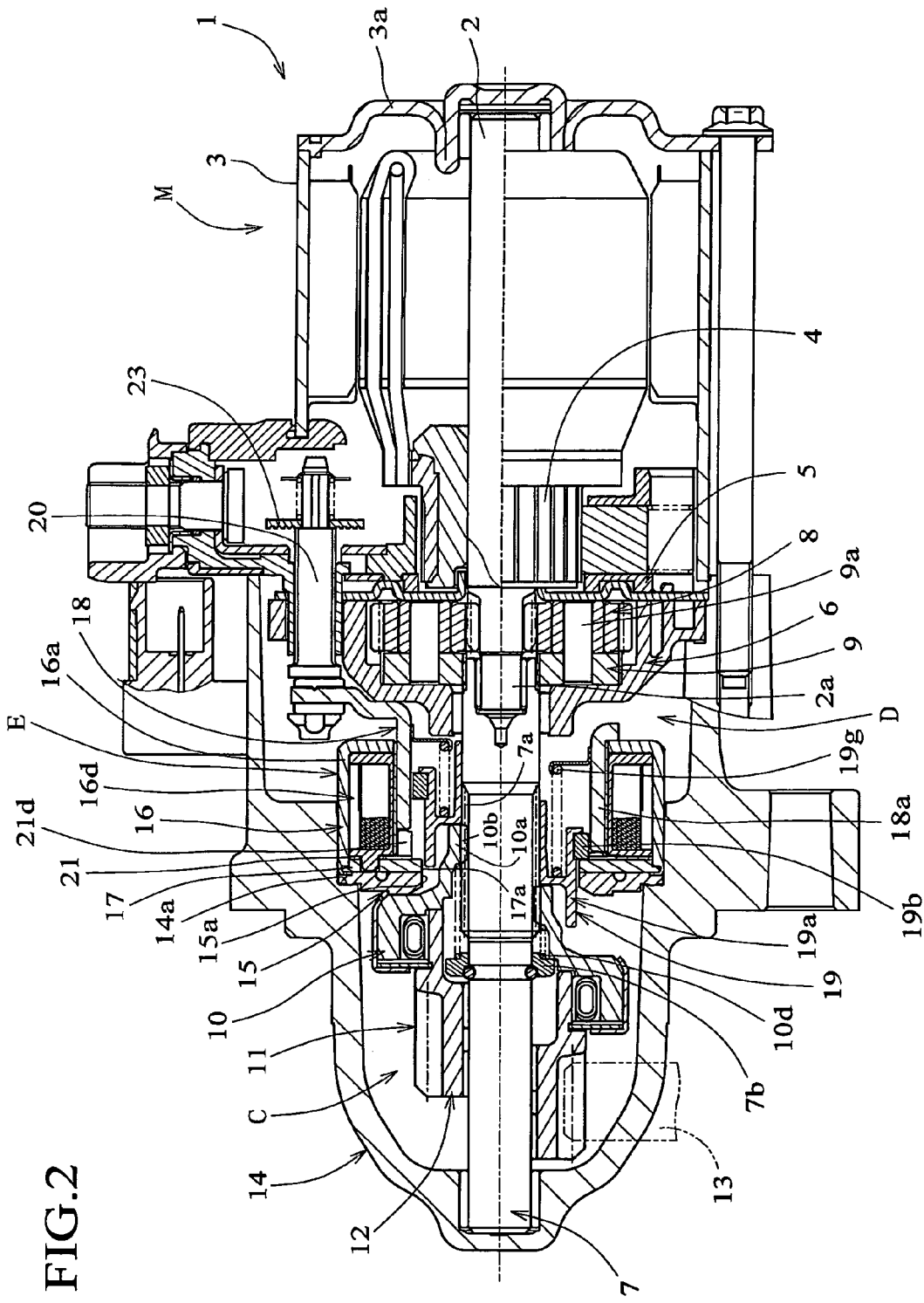
FIG. 2 is a partial sectional front view of the engine starter.
Figure 3:
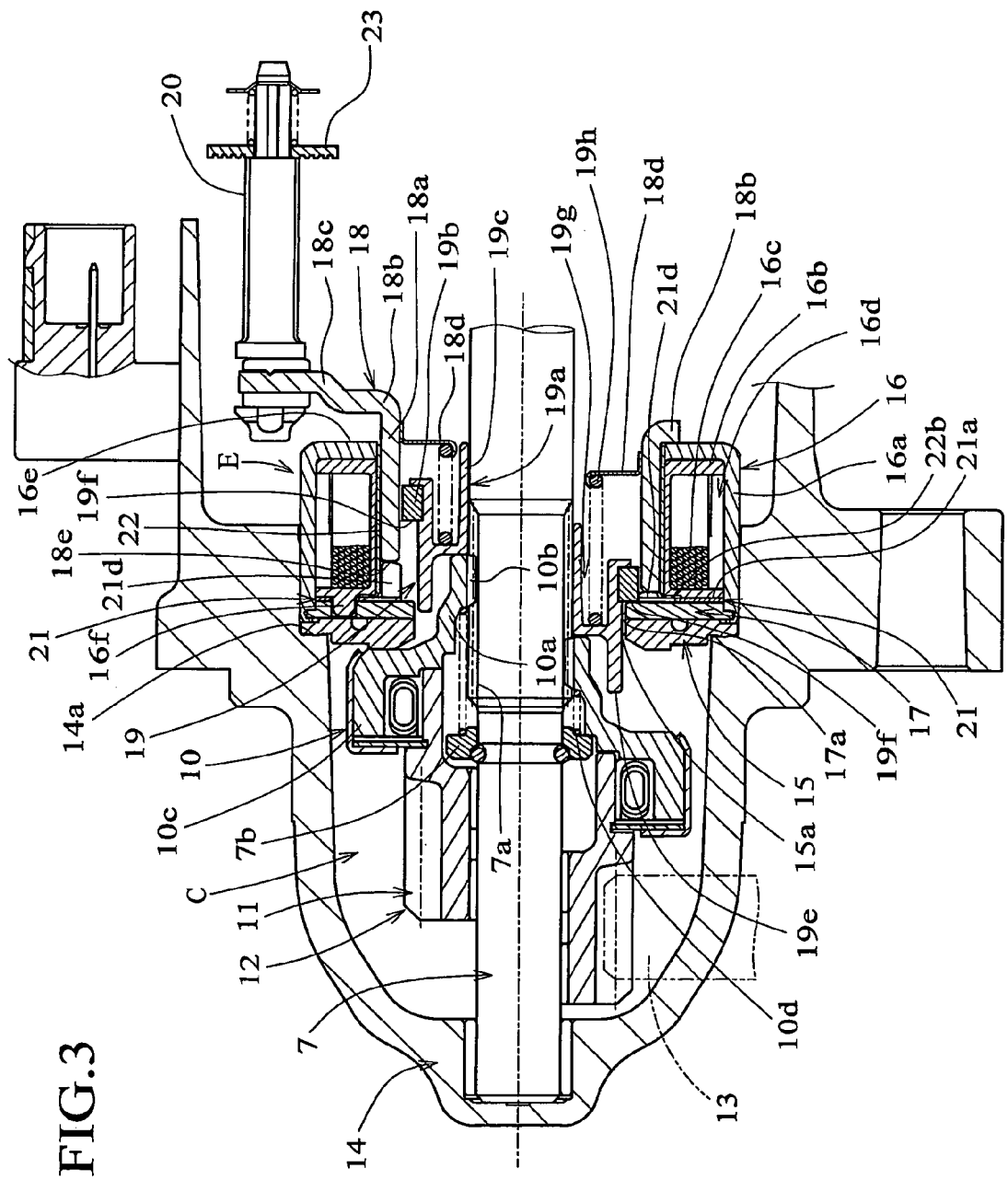
FIG. 3 is a sectional view describing configurations of an electromagnetic controller and a clutch device.

Reference numeral 1 denotes an engine starter that starts an engine installed in a vehicle and the like (see FIGS. 1A, 1B and 2). A motor unit (electric motor) M of the engine starter 1 employs a general-purpose brush-type DC motor. A base end portion of a motor shaft 2 is axially supported on an end cover 3a so as to be rotatable. The end cover 3a covers a base end side opening of a cylindrical yoke 3. A commutator 4 is fit integrally onto a tip end portion of the motor shaft 2. A ring-shaped brush holder stay 5 is fit externally onto an outer periphery of the commutator 4. The brush holder stay 5 is fit internally into a tip end side opening of the yoke 3.

A bottomed cylindrical case body 6 forms a decelerator D that is disposed on a tip end side of the motor unit M, which is adjacent to the brush holder stay 5. A tip end 2a of the motor shaft 2 is installed in the case body 6. A base end portion of the drive shaft 7 is also disposed in the case body 6 so as to fit relatively rotatably onto the motor shaft tip end 2a. In the case body 6, a plurality of planet gears 8 are also installed that engage with both an inner peripheral surface of the case body 6 and the motor shaft tip end 2a so as to rotate circumferentially in the case body 6 when the motor shaft 2 rotates. A ring-shaped support plate 9 is also installed in the case body 6 so as to be disposed concentrically with the motor shaft tip end 2a and connected with support shafts 9a of the planet gears 8. Rotation of the planet gears 8 in a circumferential direction is connected and interlocked with the drive shaft 7 because an inner periphery of the support plate 9 is fit onto (engaged with) the drive shaft 7 so as not to rotate. Accordingly, driving force of the motor unit M is transmitted to the drive shaft 7 in a decelerated manner.

A unidirectional rotation clutch part C is provided to a tip end portion of the drive shaft 7. A clutch outer 10 is formed to be a stepped cylindrical body of the clutch part C and fit onto the drive shaft 7 so as to allow a helical spline 10b that is formed on an inner peripheral surface of a smaller diameter cylindrical portion 10a to be engaged with a helical spline 7a that is formed on a tip end portion outer peripheral surface of the drive shaft 7. The clutch outer 10 moves rotatively along the helical spline 7a of the drive shaft 7 so as to be displaced (or moved) to either an non-starting position on a base end side (position shown in an upper half of FIG. 1) or a starting position on a tip end side (position shown in an lower half of FIG. 1) of the drive shaft 7 when a relative rotation occurs in a predetermined rotating direction between the drive shaft 7 and the clutch outer 10.

A clutch inner 12 with a tip end outer peripheral portion on which a pinion gear 11 is formed is connected in a larger diameter cylindrical portion 10c on a tip end side of the clutch outer 10. The clutch inner 12 is interlocked and joined such that the movement in an axial center direction (displacement) is integral with the clutch outer 10, and the movement in a circumferential direction (rotation) is integral in a predetermined rotating direction (one side) and free in another rotating direction. The clutch inner 12 is incorporated loosely onto the drive shaft 7 so as to be rotatable relative to the drive shaft 7. The clutch inner 12 is pushed out toward a tip end side while being displaced to a starting position from a non-starting position with the clutch outer 10 when the drive shaft 7 rotates in the predetermined rotating direction. Then, the pinion gear 11 on a tip end side is engaged with the ring gear 13 at the engine side. Accordingly, the engine starts when the drive shaft 7 rotates in the predetermined rotating direction.

An electromagnetic controller E to which the present invention is applied is provided between the decelerator D and the clutch part C and installed into a cylindrical gear cover 14 with the decelerator D and the clutch part C.

A clutch stopper 15 (corresponding to a plate body of the present invention) is disposed between the clutch part C and the electromagnetic controller E. The clutch stopper 15 is a member that protects an exciting coil unit 16 of the electromagnetic controller E (see FIGS. 2, 3, 4A and 4B) and formed to be a ring-shaped plate body through which a through hole 15a with a hole diameter is formed, which is described later. A tip end side surface of the clutch stopper 15 is pressed into contact with the larger diameter cylindrical portion 10c of the clutch outer 10 at the non-starting position. The smaller diameter cylindrical portion 10a is loosely fit into the through hole 15a. The clutch stopper 15 is incorporated in an abutting manner into a stepped part 14a that is formed on the gear cover 14 so as to be restricted from moving toward a tip end side. The clutch stopper 15 is also restricted from moving toward a base end side by an exciting coil unit 16 that is press-fit into the base end side of the clutch stopper 15 in an axially layered manner. Accordingly, the clutch part C is restricted by the clutch stopper 15 from moving toward the base end side.

The clutch outer 10 is urged toward an axial center direction base end side (non-starting position side) of the drive shaft 7 by a first spring 10d that is installed between the clutch outer 10 and a stopper member 7b that is provided at a tip end side of the drive shaft 7. When the clutch part C is at the starting position, the clutch outer larger diameter cylindrical portion 10c is pressed into contact with the clutch stopper 15 under an urging force (a spring pressure) of the first spring 10d.

The exciting coil unit 16, which is made of a magnetic material, is formed such that a coil main body 16d that is formed by winding a coil 16c around a coil bobbin 16b is housed in a bottomed cylindrical coil holder 16a that has a tip end side opening, and a ring-shaped plate exciting piece 17 is caulked to an opening end portion on at a tip end side of the coil main body 16d. The exciting coil unit 16 is restricted from moving in an axial center and circumferential directions with respect to the gear cover 14 because the exciting coil unit 16 is press-fit into a cylindrical part of the gear cover 14. A detailed configuration thereof will be described later.

A predetermined space exists between an inner peripheral surface of the exciting coil unit 16 and an outer peripheral surface of the drive shaft 7 so as to be ring-shaped. First and second plunger units 18 and 19 of the electromagnetic controller E are radially layered in the ring-shaped space so as to be movable in an axial center direction. The first and second plunger units 18 and 19 are displaced in the axial center direction to either an acting position or a non-acting position according to a switching of the exciting coil unit 16 between excitation and non-excitation.

The first plunger unit 18 comprises a cylindrical first plunger main body 18a along an inner peripheral surface of the exciting coil unit 16; and a flange part 18b that extends toward an outer diameter side of the first plunger main body 18a from a base end side edge portion (see FIGS. 2, 3, 5A and 5B). The flange part 18b extends so as to be latchable on a bottom piece 16e of the coil holder 16a. A shaft attaching part 18c is formed on an upper portion of an outer periphery of the flange part 18b so as to project toward an outer diameter side. A tip end portion of the switch shaft 20 is also fixed to the upper portion of an outer periphery of the flange part 18b (see FIGS. 5A and 5B). Displacement of the first plunger 18 from the non-acting position to the acting position displaces the switch shaft 20 integrally so as to allow the motor unit M and the battery to be in a conducted state from a non-conducted sate. Accordingly, the motor unit M is driven.

Reference numeral 18d denotes a ring-shaped spring bearing plate that is positioned on an inner peripheral surface base end side portion of the first plunger main body 18a.

Figure 5A:
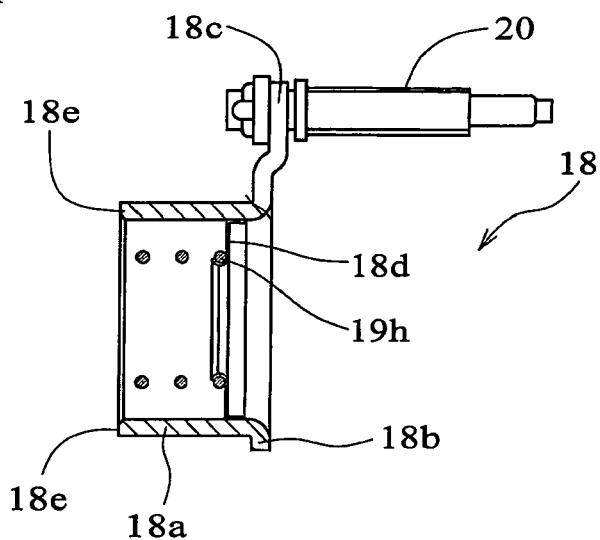
FIGS. 5A and 5B are respectively a sectional front view and a side view of a first plunger unit.
Figure 5B:
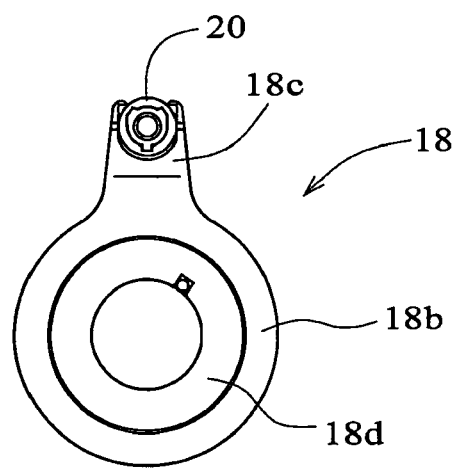
Figure 5C:
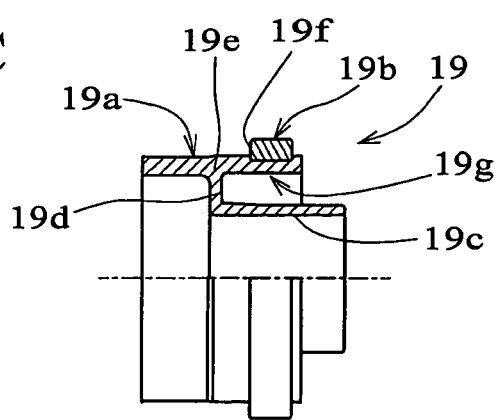
FIG. 5C is a partial sectional front view of a second plunger unit.

The second plunger unit 19 is disposed on an inner diameter side of the first plunger unit 18, positioned inside the cylinder of the first plunger main body 18a and fit onto the drive shaft 7. The second plunger unit 19 is also movable in an axial center direction relative to the first plunger main body 18a and the drive shaft 7. The second plunger unit 19 also comprises a slide body 19a made of a nonmagnetic material; and a ring-shaped second plunger main body 19b made of a magnetic material (see FIG. 5C). The slide body 19a includes an inner cylindrical part 19c that is fit onto the drive shaft 7 so as to be movable in an axial center direction; a joint 19d that is formed to be a ring-shaped plate that extends from an tip end edge toward an outer diameter side of the inner cylindrical part 19c; and an outer cylindrical part 19e (corresponding to a cylindrical part of the present invention) that extends from an outer peripheral edge toward both sides in an axial center direction of the joint 19d.

The through hole 15a of the clutch stopper 15 has the same diameter as a diameter of a through hole 17a of the exciting piece 17. The diameter of the through holes 15a and 17a is larger than an outer diameter of the outer cylindrical part 19e. The second plunger unit 19 is thus configured not to interfere with the through holes 15a and 17a. The second plunger outer cylindrical part 19e is configured such that the smaller diameter cylindrical portion 10a of the clutch outer 10 can loosely be fit into a tip end side. An inner diameter side portion of the second plunger main body 19b is embedded in an axial center direction into a base end side portion of an outer periphery of the outer cylindrical part 19e of the slide body 19a. Accordingly, the second plunger unit 19 is integrated while an outer diameter side portion of the second plunger main body 19b is exposed toward the outer diameter side.

A tip end side end face of the joint 19d of the slide body 19a is opposed to a base end side surface of the smaller diameter cylindrical portion 10a of the clutch outer 10. A ring-shaped recessed hole 19g is formed so as to be opened at a base end side by the inner cylindrical part 19c, the joint 19d and the outer cylindrical part 19e at a base end side. A second spring 19h is installed into the ring-shaped recessed hole 19g. The second spring 19h has a base end that is supported on the spring bearing plate 18d of the first plunger unit 18 and urges the second plunger unit 19 toward a side (tip end side) of the clutch outer 10. The second plunger unit 19 and the clutch outer 10 are configured such that the tip end side surface of the joint 19d of the slide body 19a is pressed into contact with the base end side surface of the clutch outer smaller diameter cylindrical portion 10a under an urging force of the second spring 19h.

Figure 4A:
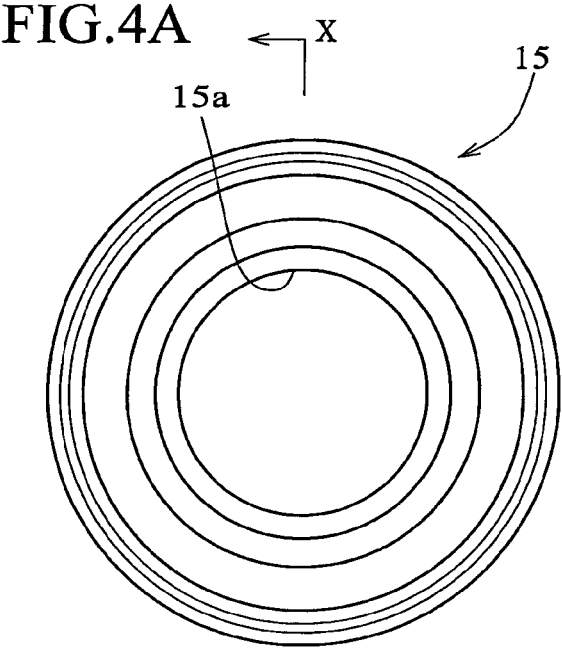
FIG. 4A is a side view of a clutch stopper and FIG. 4B is a sectional view along X-X of FIG. 4A.
Figure 4B:
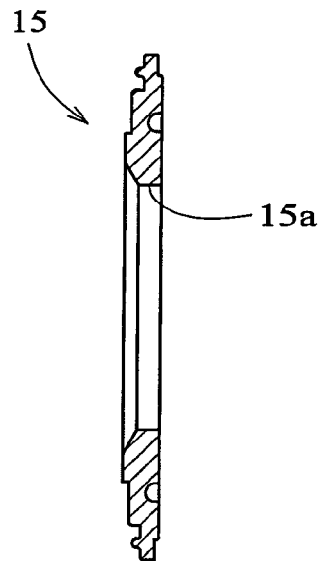
Figure 4C:
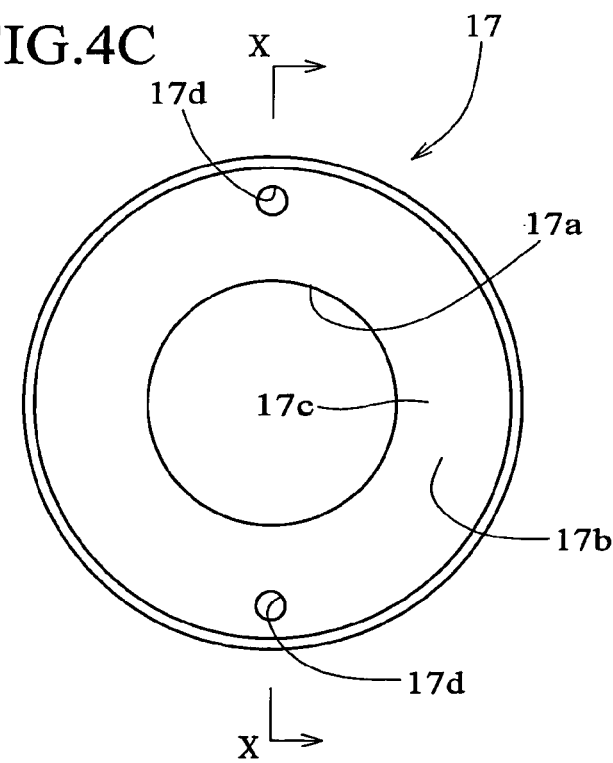
FIG. 4C is a side view of an exciting piece and FIG. 4D is a sectional view along X-X of FIG. 4C.
Figure 4D:
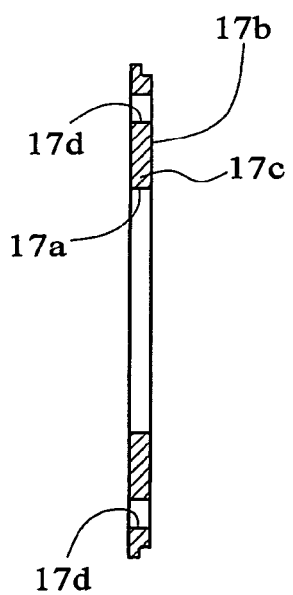

The exciting piece 17 of the exciting coil unit 16 is formed to be a ring-shaped plate (disk shape) that has an outer diameter for allowing the exciting piece 17 to be caulked to an opening end portion of the coil holder 16a in a butting manner. The outer diameter of the ring-shaped plate is smaller in diameter than an inner diameter of the coil main body 16d and projects inward rather than toward the inner peripheral surface of the exciting coil unit 16. The ring-shaped plate of the exciting piece 17 includes the through hole 17a that has a diameter larger than the second plunger unit outer cylindrical part 19e that is disposed on the inner diameter side. Accordingly, the exciting piece 17 comprises a base end side plate surface 17b that is orthogonal to an axial center direction; and a projecting piece part 17c that projects toward an inner diameter side of the coil holder 16a (see FIGS. 4C and 4D). The base end side plate surface 17b on the projecting piece part 17c is axially opposed to both a tip end face 18e of the first plunger main body 18a that is disposed along an inner peripheral surface of the exciting coil unit 16; and a tip end face 19f that is disposed adjacent to an inner diameter side of the first plunger main body 18a and exposed to an outer diameter side of the second plunger main body 19b embedded in an outer cylindrical part 19e.

A third spring 21 (corresponding to an urging member of the present invention) is incorporated and sandwiched between a tip end side piece (tip end portion of the coil main body 16d) of the coil bobbin 16b of the exciting coil unit 16 and a base end side plate surface 17b of the exciting piece 17. The third spring 21 is pressed into contact with the first plunger main body tip end face 18e of the first plunger unit 18 incorporated at an inner diameter side of the exciting coil unit 16 and urges the first plunger unit 18 toward a base end side (toward a side of the motor unit M, a non-acting position side).

The third spring 21 is formed using a metallic thin plate of a magnetic permeable material such as stainless steel. The thin plate member is formed to be a ring-shaped plate with outer and inner diameters. The outer diameter of the ring-shaped plate extends to a cylinder inner peripheral surface of the coil holder 16a, whereas the inner diameter of the ring-shaped plate is opposed to a tip end face of the first plunger main body 18a. A side portion of the outer diameter of the ring-shaped plate is formed to be a ring-shaped support part 21a having a flat plate shape to be sandwiched between a tip end side piece of the coil bobbin 16b and the base end side plate surface 17b of the exciting piece 17. An inner diameter side portion that is positioned at an inner diameter side of the exciting coil unit 16 is formed to be an urging part 21b that is opposed to and urges the first plunger main body 18a toward a base end side. Accordingly, the support part 21a and the urging part 21b are formed integrally in the third spring 21.

Figure 6A:
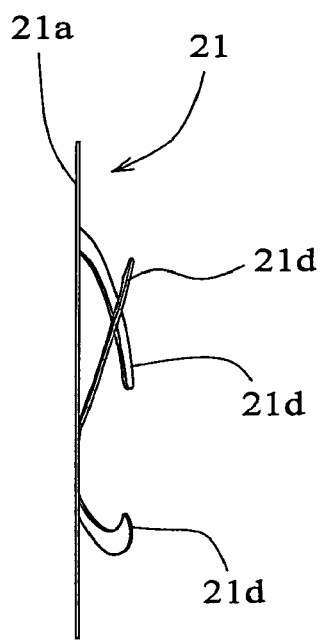
FIGS. 6A, 6B and FIG. 6C are respectively a front view, a side view and a perspective view of a third spring.
Figure 6B:
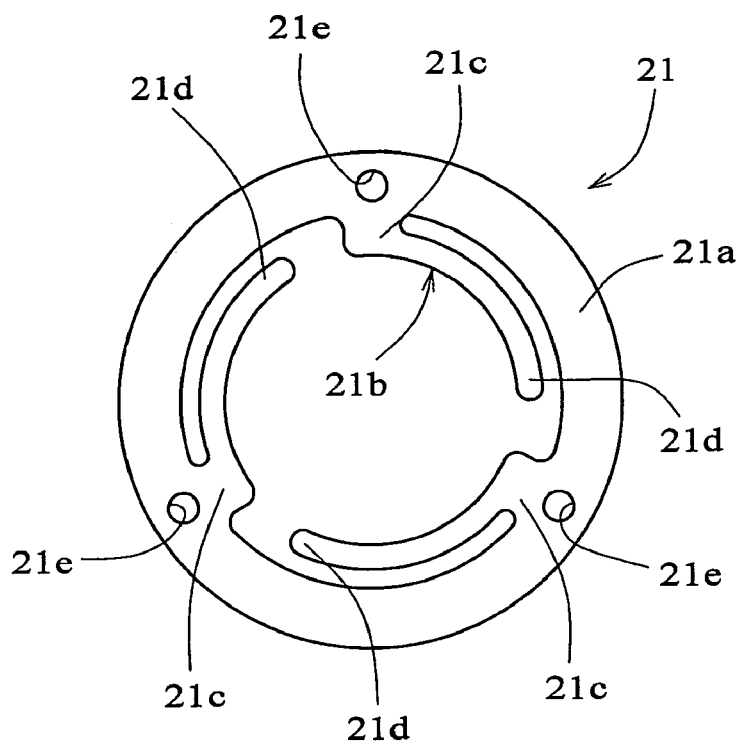
Figure 6C:
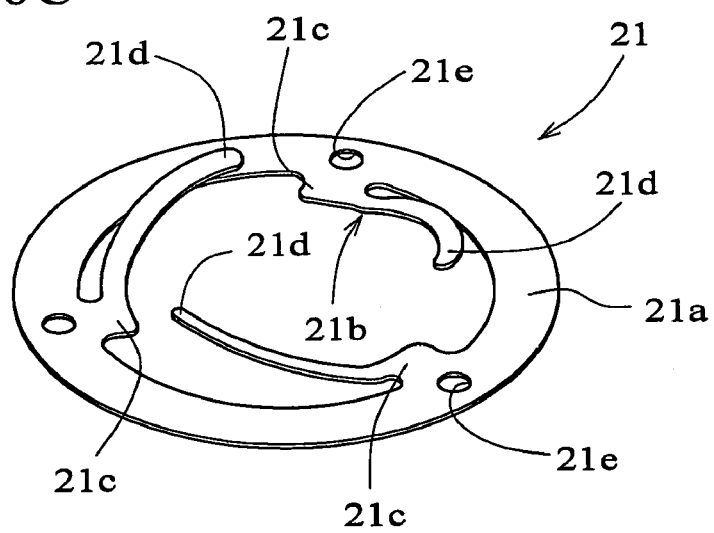
Figure 7A:
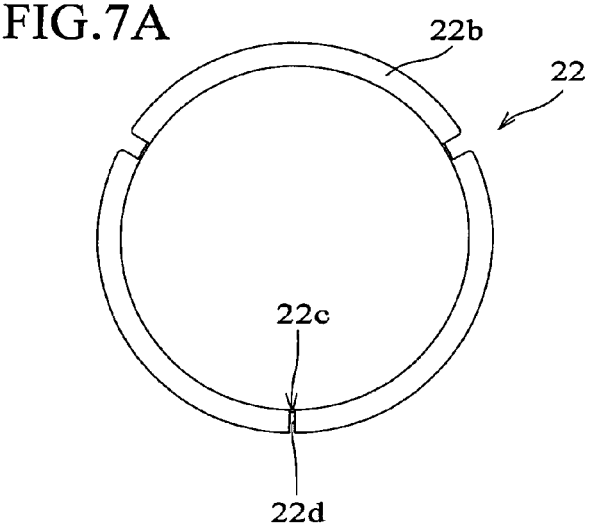
FIGS. 7A, 7B, 7C and 7D are respectively a side view, a front view, a side view and a back view of a sleeve.
Figure 7B:
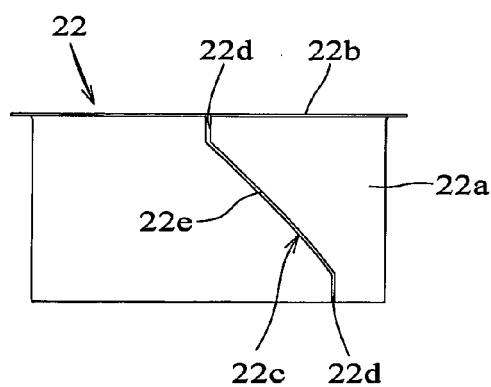
Figure 7D:
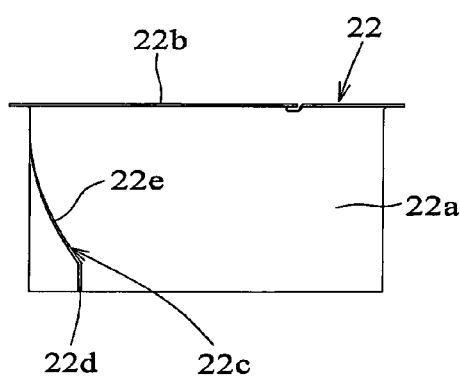
Figure 7C:
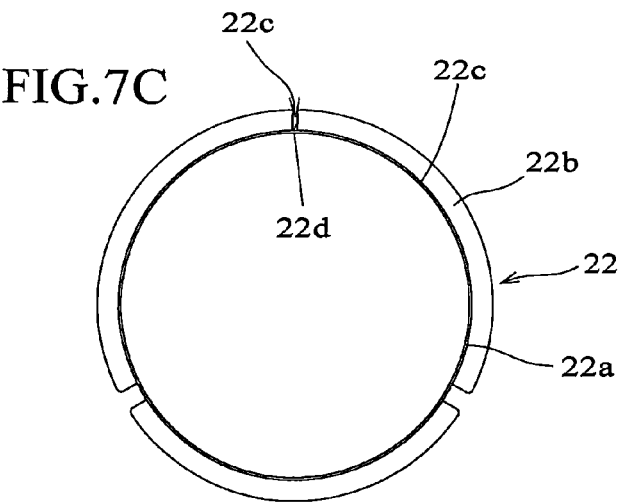

The urging part 21b of the third spring 21 is formed to be ring-shaped with elasticity by punching and bending an inner diameter side portion of the ring-shaped plate of the third spring 21 (see in FIGS. 6A, 6B and 6C). Projecting pieces 21c are formed at an inner diameter side corresponding to portions of the support part 21a at an outer diameter side. The projecting pieces 21c are circumferentially at three points and extend to portions corresponding to the urging part 21b (see in FIGS. 6A, 6B and 6C). Portions that project toward an inner diameter side of the coil bobbin 16b are punched to be circumferentially long and arched band-like bodies. The portions are continuous in a circumferential direction of the respective projecting pieces 21c in a radial length (width) of portions corresponding to the urging part 21b in a state where the support part 21a is sandwiched between the coil bobbin 16b and the exciting piece 17. Pressing pieces 21d with elasticity are formed by bending portions of the circumferentially long, arched band-like bodies that extends from the projecting parts 21c toward a base end side (the first plunger unit 18). The pressing pieces 21d are circumferentially at three points (see in FIGS. 6A, 6B and 6C) and charge an urging force toward an axial base end side when extending end portions of the pressing pieces 21d are pressed toward an axial tip end side. Accordingly, the urging part 21b urges the first plunger unit 18 toward the base end side at the circumferential three points.

A sleeve 22 is provided between a cylindrical inner peripheral surface of the coil bobbin 16b (exciting coil unit 16) of the electromagnetic controller E and an outer peripheral surface of the first plunger main body 18a of the first plunger unit 18. The first plunger unit 18 is thus configured to be smoothly displaced in an axial center direction. The sleeve 22 of the present embodiment can achieve a reliable central alignment based on the drive shaft 7 of the first plunger unit 18. In addition, the sleeve 22 of the present embodiment is configured as described below so that the first plunger unit 18 can maintain the smooth displacement in the axial center direction for a longer time.

The sleeve 22 is formed by bending a metal plate member of a thin-plate-like long body to be a cylindrical shape. The sleeve 22 comprises a cylindrical main body 22a; a flange 22b that extends in an outer diameter direction from a tip end side in an axial center direction of the main body 22a; and a slit 22c that is formed between opposite end portions in a longitudinal direction of the metal plate member (see FIGS. 7A-7D and 8A-8B). The sleeve 22 is incorporated along an inner peripheral surface of the exciting coil unit 16 (coil bobbin 16b) in a state where the slit 22c expands (is pushed to expand). The flange 22b is incorporated so as to be supported and sandwiched between the tip end side piece of the coil bobbin 16b and the urging spring support part 21a. Accordingly, the sleeve 22 is positioned and restricted from moving in an axial center direction with respect to the exciting coil unit 16.

In order to form the sleeve 22 of the present embodiment, opposite end cutting portions of the metal plate member in a longitudinal direction are cut such that opposite end portions in an axial center direction are cut orthogonally with respect to a longitudinal direction, whereas an intermediate portion in an axial center direction is cut so as to tilt in the longitudinal direction. A shape of the slit 22c, which is formed by bending the metal plate member cylindrically, is formed such that the opposite end portions in the longitudinal direction of the metal plate member are cut so as to be orthogonal to the longitudinal direction on the end portion at the tip end side in the axial center direction where the flange 22b is formed and at the base end side in the axial center direction of the main body 22a. The cut portions are thus formed to be straight portions 22d that are cut like longitudinal sections without being successively displaced in the circumferential direction. Accordingly, the shape of the slit 22c of the flange 22b can be easily formed without being complicated.

An intermediate portion in an axial center direction of the slit 22c is formed to be a spiral tilt portion 22e successively displaced in a circumferential direction from the tip end side to the base end side in an axial center direction by cutting the opposite end portions of the metal plate member in the longitudinal direction so as to tilt in the longitudinal direction. The straight portions 22d at opposite end portions in an axial center direction are circumferentially displaced. Accordingly, when the first plunger main body 18a of the first plunger unit 18, which is displaced in the axial center direction on the inner peripheral surface of the sleeve 22, is displaced inside the sleeve 22, even if the first plunger main body 18a deflects toward a side where the slit 22c is formed, an outer peripheral surface of the first plunger main body 18 at the deflecting side is pressed into sliding contact with the main body 22c of the sleeve 22 at any point in the axial center direction. That is, there is no case where a slit is formed straight (like a longitudinal section) in an axial center direction such that cut portions of the slit are strongly abut against the first plunger unit so as to wear an outer peripheral surface of the first plunger unit. Accordingly, the first plunger main body 18a is prevented from being abnormally worn. The first plunger unit 18 can thus be smoothly displaced in the axial center direction for a longer period of time. The first plunger main body 18a is also prevented from being eccentric. Furthermore, the second plunger 19, which is displaced along the first plunger main body 18a, can also be reliably smoothly displaced in the axial center direction.

Figure 8A:
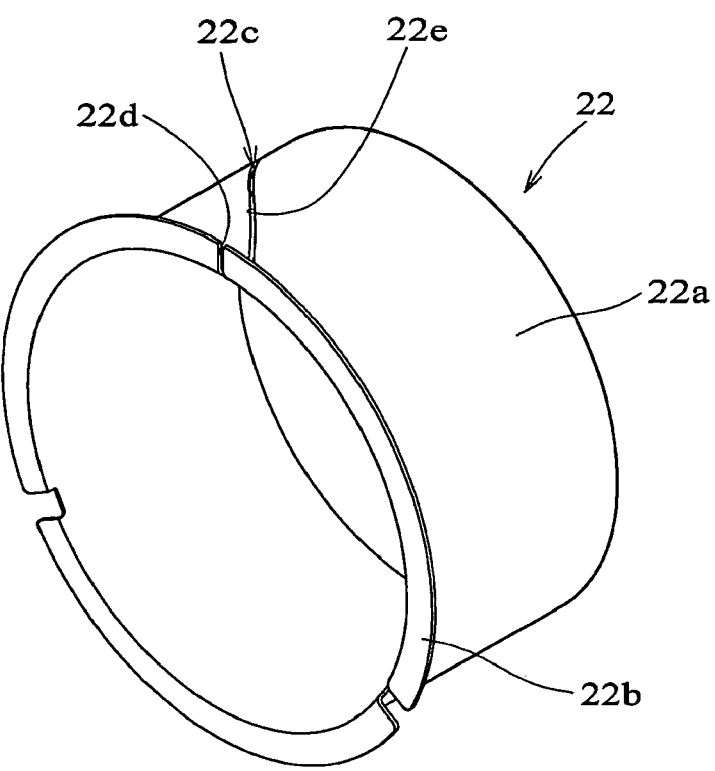
FIG. 8A is a perspective view of the sleeve.
Figure 8B:
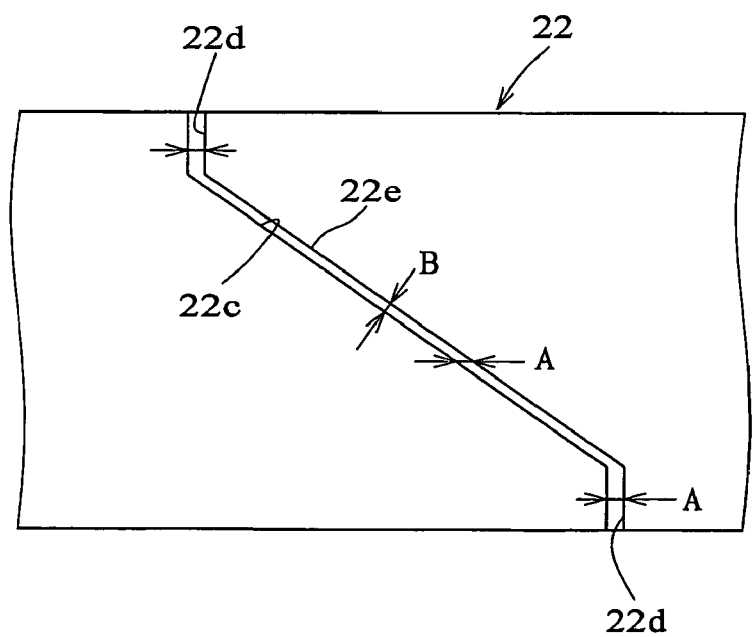
FIG. 8B is a schematic view showing a state where the sleeve is developed to describe a slit width.

When the slit 22c is formed as described above, a slit width of the slit 22c is formed to be a slit width A, as shown in FIG. 8B. The slit width A is equal to a circumferential opposing distance at the straight portions 22d at opposite end portions in an axial center direction of the slit 22c. The slit width A is also equal to a circumferential opposing distance at the tilt portions 22e. An opposing distance between opposing cut portions of the tilt portions 22e is formed to be slit width B and narrower than the slit width A. Accordingly, the first plunger main body 18a is more smoothly displaced in the axial center direction.

Further, the longitudinal-section-shaped straight portions 22d are also formed at base end sides of the tilt portions 22e of the slit 22c. Accordingly, the cut portions at the base end side of the slit 22 are formed so as not to project in an acute angle. The cut portions are thus prevented from being deformed.

Incorporation of the exciting coil unit 16 of the above-described electromagnetic controller E is carried out through the following steps.

The coil main body 16d is installed from the coil holder 16a opening end portion such that a base end side piece of the coil bobbin 16b is pressed into contact with the bottom piece 16e of the coil holder 16a. After that, the cylindrical sleeve 22 is inserted from the opening end side into the inner diameter side of the coil bobbin 16b.

Subsequently, the third spring 21 is incorporated from the coil holder 16a opening end portion such that the pressing pieces 21d are positioned closer to the inner diameter side than the sleeve 22 (coil bobbin 16b), and the support part 21a is layered on the coil bobbin 16b tip end side piece. Further, the exciting piece 17 is pressed against the coil holder 16a opening end portion while being layered on the third spring 21. Then, by caulking a caulking piece that is formed on the coil holder 16a opening end portion, the exciting coil unit 16 is formed to incorporate the exciting piece 17; the third spring 21; and the coil main body 16d. Accordingly, the third spring 21 is incorporated such that the support part 21a is supported to be sandwiched between the exciting piece base end side plate surface 17b and the coil bobbin 16b tip end side piece (the flange 22b of the sleeve 22). The urging part 21b (pressing pieces 21d) projects toward the inner diameter side of the sleeve 22. The third spring 21 can be incorporated with excellent operability because the third spring 21 is incorporated into the exciting coil unit 16 without an additional support member. The third spring 21 can also be provided simply and easily. In addition, no fixing member is necessary for the third spring 21. The engine starter 1 can thus achieve a reduced weight and cost.

A projecting piece 16f is formed to the coil bobbin 16b tip end side piece at a point in a circumferential direction. Positioning holes 21e and 17d into which the projecting piece 16f is fit are respectively formed in the support part 21a of the third spring 21 and the exciting piece 17 at a plurality of points in a circumferential direction. In order to incorporate the third spring 21 and the exciting piece 17, when the coil holder 16a is caulked to be fixed while one of the positioning holes 21e and 17d is fit onto the projecting piece 16f, each of the coil bobbin 16b, the third spring 21 and the exciting piece 17 is circumferentially and radially positioned so as to prevent their positional deviation and the like.

The exciting coil unit 16 is incorporated into the gear cover 14 after the drive shaft 7 having the clutch part C incorporated therein and the clutch stopper 15 are incorporated. Subsequently, the second plunger unit 19 is incorporated along an outer periphery of the drive shaft 7, and the first plunger unit 18 is incorporated along an inner periphery of the exciting coil unit 16 (an inner periphery of the sleeve 22). Accordingly, there is required no troublesome operation of the conventional method in which the first plunger unit 18 needs to be positioned and pressed against compression springs provided at a plurality of points of an opening end of the gear cover. In the present embodiment, by simply pressing the flange part 18b along the exciting coil unit 16 inner periphery, the urging part 21b (circumferential three pressing pieces 21d) of the third spring 21 is configured to be pressed against the first plunger main body tip end face 18e. Accordingly, the first plunger unit 18 can maintain its balance. By incorporating the case body 6 of the decelerator D into an opening end of the gear cover 14 in an abutting manner after the incorporation of first and second plunger units 18 and 19, the first plunger unit 18 can receive a well balance urging force of the second and third springs 19h and 21. Accordingly, the incorporation of the first plunger unit 18 is simpler and easier.

In addition, the first plunger unit 18 is configured such that the first plunger main body 18a on the inner diameter side is urged by the respective pressing pieces 21d of the third spring 21. Accordingly, the first plunger unit 18 can prevent axial deviation and achieve a well-balanced smooth displacement in the axial center direction.

Next, operations of the electromagnetic controller E will be described. When the exciting coil unit 16 is in anon-exciting state, the first plunger unit 18 is under an urging force of the third spring 21, the flange part 18b is pressed into contact with a bottom portion of the case body 6 of the decelerator D, and the first plunger unit 18 is positioned at a non-acting position apart from the bottom piece 16e of the coil holder 16a at a base end side of the exciting coil unit 16 (see upper halves of FIGS. 2 and 3).

In the non-exciting state of the exciting coil unit 16, the second plunger unit 19 is pushed back by the clutch outer 10 because an urging force of the second spring 19h is smaller than an urging force of the first spring 10d disposed on the clutch outer 10. The tip end face 19f of the second plunger main body 19b is positioned at the non-acting position closer to a base end side than the tip end face 18e of the first plunger main body 18a (see upper halves of FIGS. 2 and 3). When the exciting coil unit 16 is in an exciting state, the first plunger unit 18 is attracted by the exciting piece 17 so as to be displaced prior to the second plunger unit 19.

When an ignition switch (not shown) in the vehicle is turned on from the non-exciting state, the exciting coil unit 16 is excited and the exciting piece 17 is magnetized to attract the first and second plunger main bodies 18a and 19a. As described above, the first plunger main body 18a, prior to the second plunger 19, is attracted against the urging force of the third spring 21 and displaced to the acting position at which the flange part 18b is pressed into contact with the bottom piece 16e of the coil holder 16a so as to be restricted from moving. The switch shaft 20 on the first plunger 18 is displaced with the first plunger 18. When the first plunger 18 is displaced to the acting position, the battery is electrically connected with the motor unit M by a switch contact 23 provided on the base end portion of the switch shaft 20. Accordingly, power is supplied to the motor unit M. In addition, during displacement from the non-acting position to the acting position of the first plunger unit 18, the tip end face 18e of the first plunger main body 18a is adjacent to the projecting piece part 17c of the exciting piece 17 while elastically deforming the pressing pieces 21d, and stores the urging force of the second spring 19h interposed between the tip end face 18e and the second plunger unit 19.

When the urging force of the second spring 19h, which is stored when the first plunger 18 is displaced toward the tip end side, is greater than the urging force of the first spring 10d, the second plunger main body 19b is attracted by the magnetized exciting piece 17, displaced toward the tip end side in the axial center direction, and positioned at the acting position at which the tip end face 19f of the second plunger main body 19b is pressed into contact with an inner diameter side portion where the third spring 21 is not layered on the projecting piece part 17c of the exciting piece 17. Accordingly, the joint 19d of the slide body 19c displaces the clutch outer 10 and the clutch inner 12 to the starting positions at the tip end side in the axial center direction against the urging force of the first spring 10d. The pinion gear 11 is thus engaged with the ring gear 13 (see lower halves of FIG. 1 and FIG. 2).

The engine starts in the above-described state. When excitation of the exciting coil unit 16 is deactivated, the exciting piece 17 is demagnetized. The first plunger unit 18 is displaced to the non-acting position under the urging force of the third spring 21, whereas the second plunger unit 19 is displaced to the non-acting position under the urging force of the first spring 10d that is greater than the urging force of the second spring 19h that urges the second plunger unit 19 toward the tip end side. The clutch outer 10 and the clutch inner 12 are also displaced to the starting positions under the urging force of the first spring 10d.

In the electromagnetic controller E, an intervening space is formed between the clutch part C and the clutch stopper 15 when the clutch part C is displaced from the non-starting position to the starting position. It is supposed that foreign matters may be included through the intervening space in a tip end side of the first plunger unit 18 at an inner peripheral side of the exciting coil unit 16. The third spring 21 is provided at a tip end side of the first plunger unit 19. When a foreign matter is between the pressing pieces 21d of the urging part 21b and the base end side plate surface 17b of the exciting piece 17, the pressing pieces 21d may deform and the first plunger unit 18 may be unable to be displaced by a predetermined displacement stroke. Then, such foreign matter needs to be addressed.

In the present embodiment, in order to prevent the invasive foreign matters, a tip end of the outer cylindrical part 19e has a length that extends to a position radially opposed to the exciting piece 17 when the exciting coil unit 16 (coil main body 16d) is in the non-exciting state, that is, when the second plunger unit 19 is at the non-acting position. Further, a distance of an intervening space that is formed between the outer peripheral surface of the outer cylindrical part 19e and the inner peripheral surface of the exciting piece through hole 17a during the displacement of the second plunger unit 19 to the acting position from the non-acting position is kept constant. Accordingly, a foreign matter that has a diameter larger than the intervening space is prevented from being into the inner peripheral side of the exciting coil unit 16.

Figure 9:
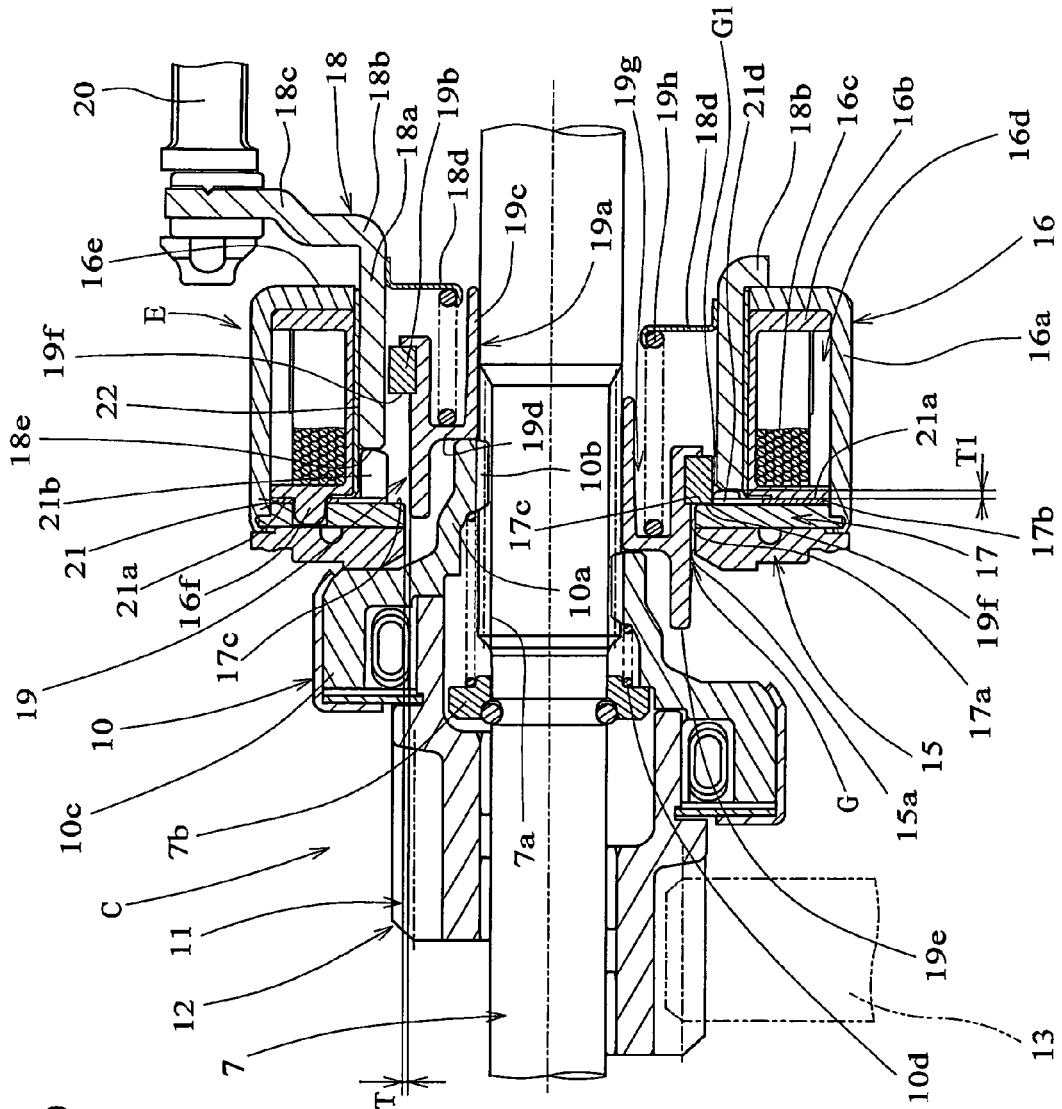
FIG. 9 is an enlarged sectional view describing configurations of the electromagnetic controller and the clutch device.
Figure 10:
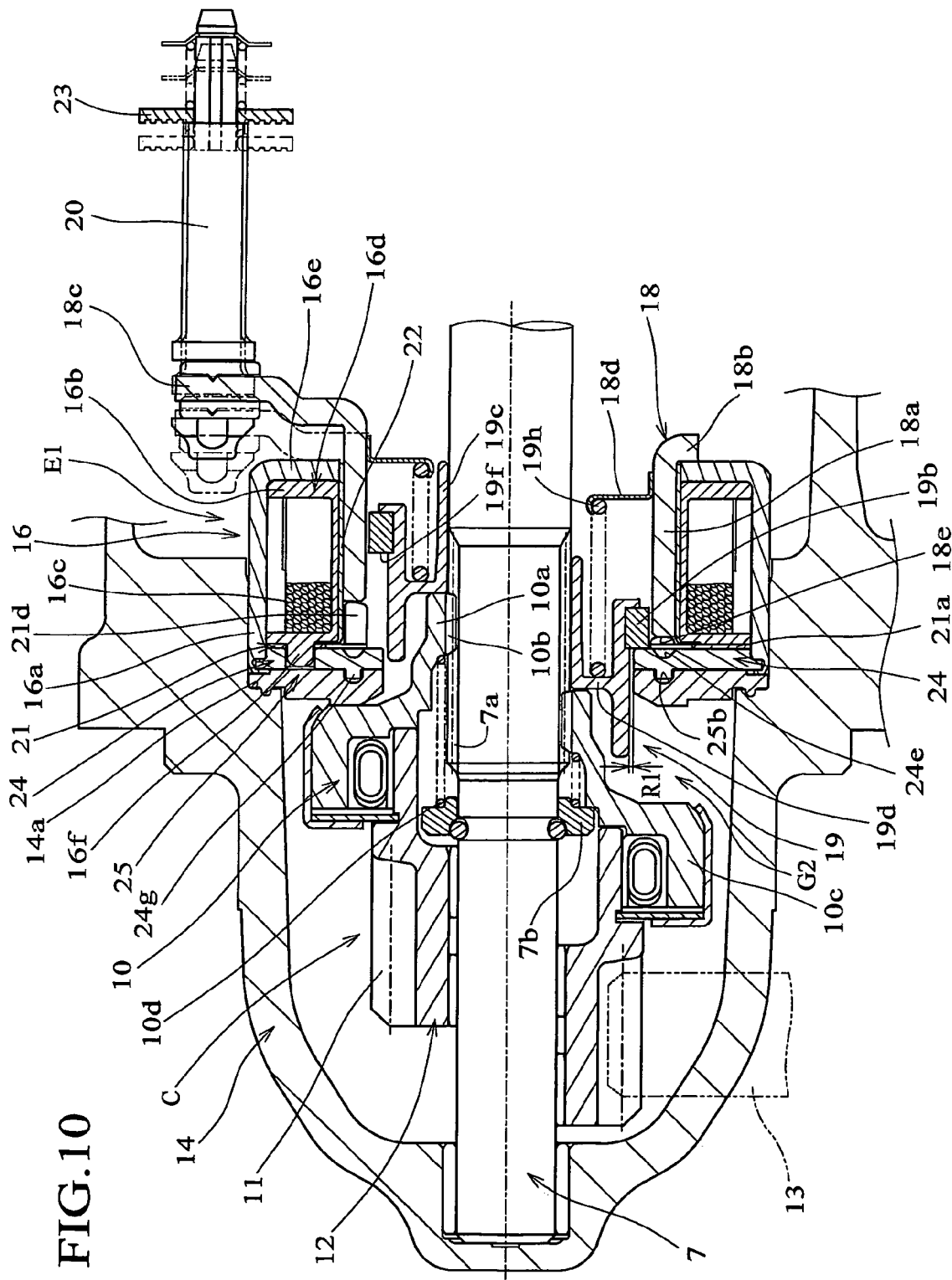
FIG. 10 is a sectional view describing configurations of an electromagnetic controller and a clutch device of a second embodiment.

Reference numeral G denotes the intervening space between the outer peripheral surface of the outer cylindrical part 19e and the inner peripheral surface of the exciting piece through hole 17a (clutch stopper through hole 15a) in the preset embodiment, as shown in FIG. 9. The intervening space G is set to be a predetermined intervening space T. Further, the intervening space T is set to be G1 that is formed at a side of the exciting piece 17 of the first plunger main body tip end face 18e when the first plunger unit 18 is at the acting position at which the battery and the motor unit M are conductive to each other. In addition, the intervening space T is narrower (smaller) than an intervening space T1 between the first plunger main body tip end face 18e and the base end portion 21c of the urging part 21b that is a flat plate part of the third spring 21 (T<T1). Accordingly, a foreign matter that is larger than the intervening space T of the intervening space G cannot be into a side of the exciting coil unit 16 through the intervening space G. Even if a foreign matter from a side of the ring gear 13 is between the pressing piece 21d at a side of the first plunger main body tip end face 18e and the exciting piece 17, because such foreign matter is smaller than the intervening space T1 of the gap G1, the first plunger unit 18 can secure the displacement stroke from the non-acting position to the acting position without being short. Accordingly, the motor unit M and the battery are prevented from not being conductive to each other, and the motor unit M can avoid failure.

In the engine starter 1 of the present embodiment configured as described above, when power is supplied to the exciting coil unit 16 of the electromagnetic controller E by turning the not-shown ignition switch on, the first and second plunger units 18 and 19 are attracted to be displaced to the acting positions, battery power is supplied to the motor unit M, the pinion gear 11 of the clutch part C is engaged with the ring gear 13, and the engine starts. When the exciting coil unit 16 is demagnetized after the engine starts, the clutch part C returns to the non-starting position, and the first and second plunger units 18 and 19 return to the non-acting positions. The pressing force of the urging part 21b directly acts on the first plunger main body 18a positioned at the inner diameter side of the first plunger unit 18 because the urging part 21b of the third spring 21, which returns the first plunger unit 18 to the non-acting position, is positioned at the inner diameter side of the exciting coil unit 16. Accordingly, the first plunger unit 18 can be smoothly urged toward the base end side in a well-balanced manner. An engine starter can be provided with high reliability. Unlike the conventional configuration in which incorporation of the first plunger unit is troublesome, complicated and unstable because return structure is provided dispersedly at a plurality of points of the outer diameter side portion of the first plunger main body, the incorporation according to the present embodiment can be carried out simply and easily.

Furthermore, since the third spring 21 is configured to urge the first plunger main body 18a that is an inner diameter side member of the first plunger 18, the present invention can achieve advantages in that an axial deviation of the first plunger 18 can be reduced, and the first plunger 18 can also be displaced smoothly in the axial center direction. In addition, the electromagnetic controller E can remain compacted and downsized because the urging part 21b urges the tip end face of the first plunger main body 18a.

In the above-mentioned configuration where the present invention is carried out, the third spring 21 urges the first plunger unit 18 to the non-acting position and urges the tip end face 18e of the first plunger main body 18a. The third spring 21 is formed to be a uni-member in which the support part 21a and the urging part 21b are incorporated. The support part 21a and the urging part 21b for urging the first plunger main body 18a are layered between the exciting piece 17 having the base end side plate surface 17b orthogonal to the axial center direction, and the tip end side piece of the exciting coil unit 16 (coil bobbin 16b). Accordingly, the third spring 21 can be easily incorporated.

Further, the exciting piece 17 is caulked to the coil holder 16a, and the third spring 21 is supported to be sandwiched between the exciting piece 17 and the tip end side piece of the coil bobbin 16b installed in the coil holder 16a. The third spring 21 can thus be supported on the engine starter 1 (gear cover 14) without an additional support member. Unlike the conventional configuration in which the spring bearing piece and the spring housing are provided, the engine starter of the present invention can achieve a light weight and can be compact. Accordingly, the incorporating operation is easy and can also contribute to cost reduction.

In the third spring 21, the urging part 21b, which is formed on the inner diameter side portion of the plate-shaped plate member, is formed of pressing pieces 21d that are provided at a plurality of positions in the circumferential direction so as to be long in the circumferential direction and bent toward the first plunger unit 18 side. Accordingly, the configuration can be simplified, and incorporation quality can also be further improved.

Although foreign matters may be exist between the pressing pieces 21d of the third spring 21 and the exciting piece 17 in this configuration, foreign matters are difficult to be therebetween because the outer cylindrical part 19e, which penetrates through the through hole 17a of the exciting piece 17 and extends to the tip end side of the exciting piece 17 according to displacement to the acting position, is formed on the second plunger unit 19. In addition, even if foreign matters may be between the tip end of the first plunger unit 18 and the pressing pieces 21d through the intervening space T, the pressing pieces 21d can avoid deformation and the first plunger unit 18 can maintain the displacement stroke because the intervening space T between the inner diameter of the through hole 17a of the exciting piece 17 and the second plunger unit outer cylindrical part 19e is narrower than the intervening space T1 between the first plunger unit 18 at the acting position and the urging part 21a of the urging member 21.

The present invention is not limited to the above-described embodiment, and there is provided a second embodiment, as shown in FIGS. 10, 11A-11B, 12A-12C and 13A-13B.

An electromagnetic controller E1 of the second embodiment has the same basic configuration of the first embodiment. For example, the third spring 21 urges the first plunger unit 18. The second embodiment employs a different approach for preventing the pressing pieces 21d of the third spring 21 from being deformed and the first plunger unit 18 from being unable to be displaced in a predetermined displacement stroke because of foreign matter at a side of the electromagnetic controller E1. In the drawings, the same components as in the first embodiment are given the same reference numerals of the first embodiment, and a description thereof is omitted.

In the second embodiment, an exciting piece 24 is caulked with the sleeve 22 and the third spring 21 to an opening end portion of the coil holder 16a of the exciting coil unit 16. The exciting piece 24 is formed to be a ring-shaped plate in which a through hole 24a is opened. The exciting piece 24 also includes a base end side plate surface 24b that is formed to be orthogonal in an axial center direction. By setting a hole diameter of the through hole 24a to be smaller than an inner diameter of the coil main body 16d, the exciting piece 24 also includes a projecting piece part 24c that is formed on an inner diameter side portion so as to project from an inner diameter of the coil main body 16d (inner peripheral surface of the exciting coil unit 16). The exciting piece 24 also includes positioning holes 24d that are formed for positioning with respect to the exciting coil unit 16. A hole diameter of the exciting piece through hole 24a does not interfere with the outer cylindrical part 19e of the slide body 19a of the second plunger unit 19. The base end side plate surface 24b of the projecting piece part 24c is opposed in an axial center direction with respect to both the tip end face 18e of the first plunger main body 18a and the tip end face 19f of the second plunger main body 19b that is positioned at the inner diameter side of the tip end face 18e of the first plunger main body 18a. This configuration is the same as that of the first embodiment.

Further, when the second plunger unit 19 is at the non-acting position, the tip end of the outer cylindrical part 19e extends to the position opposed radially to the exciting piece 24. An intervening space R1 is formed between the outer peripheral surface of the outer cylindrical part 19e and the inner peripheral surface of the exciting piece through hole 24a while the second plunger unit 19 is displaced from the non-acting position to the acting position. This configuration is also similar to that of the first embodiment.

Figures 12A, 12B, 12C:
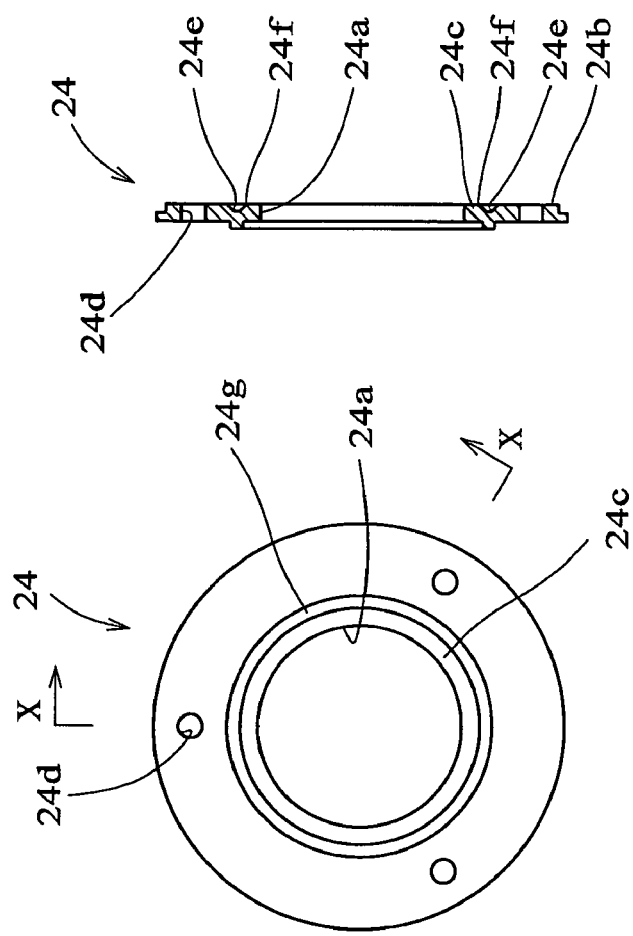
FIGS. 12A, 12B and 12C are respectively a side view, a sectional view along X-X of FIG. 12A and a side view of an exciting piece of the second embodiment.

In the exciting piece 24 of the present embodiment, a ring-shaped recessed groove 24e is formed at a base end side plate surface 24b of the projecting piece part 24c opposed to the pressing pieces 21d, as shown in FIGS. 12B and 12C. An intervening space G2 is formed between the clutch outer 10 and the clutch stopper 15, as the clutch part C is displaced to the starting position. Even if a foreign matter is between the exciting piece 24 on the inner peripheral side of the exciting coil unit 16 and the pressing pieces 21d through the intervening space R1 and the intervening space G2, deformation of the pressing pieces 21d can be prevented because the foreign matter is into the recessed groove 24e.

Figure 13A:
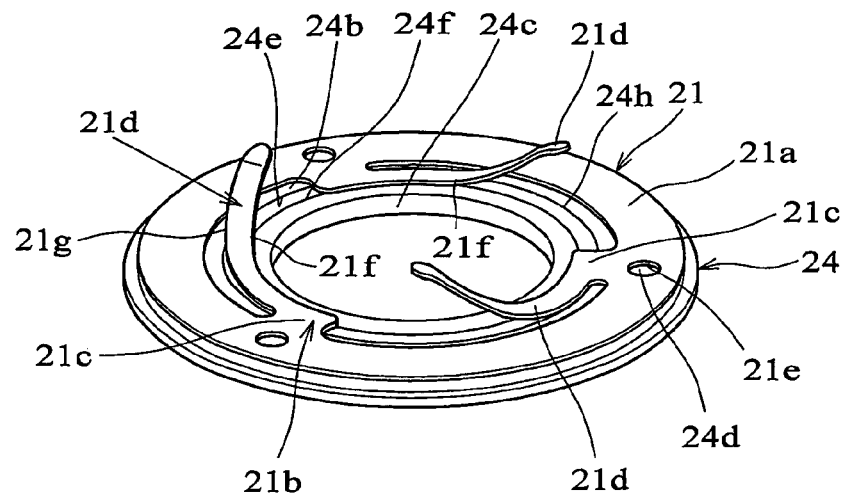
FIG. 13A is a perspective view showing an incorporated state of the exciting piece and a third spring of the second embodiment.
Figure 13B:
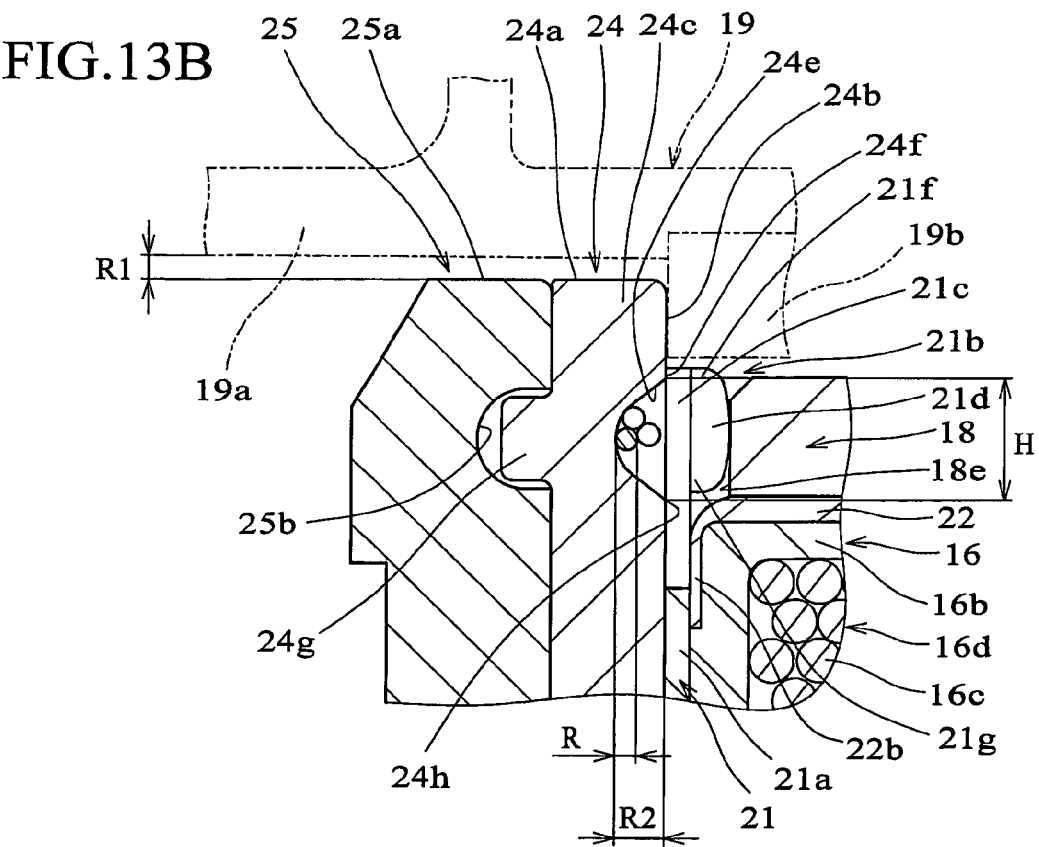
FIG. 13B is an enlarged sectional view describing portions of the second embodiment.

An outer diameter R of a foreign matter that may enter a side of the electromagnetic controller E should be smaller than the intervening space R1 (R<R1) because such foreign matter enters thereinto via the intervening space R1 between the outer peripheral surface of the outer cylindrical part 19e and the inner peripheral surface of the exciting piece through hole 24a, as shown in FIG. 13B of the second embodiment. In addition, a groove width H of the recessed groove 24e is greater than the intervening space R1 that serves as a route of such foreign matter into the electromagnetic controller E side between the outer peripheral surface side of the outer cylindrical part 19e and the inner peripheral surface side of the exciting piece through hole 24a (H>R1). A groove depth R2 is greater than the intervening space R1 (R2>R1). Accordingly, even if a foreign matter between the exciting piece 24 and the pressing pieces 21d enters the recessed groove 24e, the foreign matter is reliably into the recessed groove 24e. Accordingly, the pressing pieces 21d can be reliably prevented from being bent by the foreign matter.

Grease may be applied to sliding surfaces for smooth relative movements between an outer peripheral surface of the first plunger main body 18a of the first plunger unit 18 and an inner peripheral surface of the sleeve 22 as well as between an outer peripheral surface of the second plunger main body 19b of the second plunger unit 19 and an inner peripheral surface of the first plunger main body 18a. The grease may flow into the recessed groove 24e from the electromagnetic controller E1. In this case, there is an advantage in that a foreign matter inside the recessed groove 24e sticks to the grease so as to be confined within the recessed groove 24e because the grease pools on a groove bottom side of the recessed groove 24e.

A groove edge 24f at an inner diameter side is opposed in an axial center direction with respect to inner diameter side end edge portions 21f of the pressing pieces 21d in this configuration of the recessed groove 24e. When the pressing pieces 21d are pressed against the exciting piece 24, the inner diameter side end edge portions 21f abut against the inner diameter side groove edge 24f of the recessed groove 24e so as not to sink into the recessed groove 24e. Accordingly, the pressing pieces 21d, which are cut and raised toward a base end side so as to store an urging force toward the tip end side, are not allowed to be displaced toward a tip end side beyond the projecting pieces 21c (urging part 21b) of the extending base end portions of the pressing pieces 21d. The pressing pieces 21d can thus maintain a spring feature.

The recessed groove 24e is also configured such that a groove edge 24h at an outer diameter side is formed to be positioned closer to an outer diameter side than an outer diameter side end edge portion 21g of the pressing pieces 21d that is opposed to an inside of the recessed groove 24e. Accordingly, even if foreign matter is between the outer diameter side end edge portions 21g of the pressing pieces 21d and the groove edge 24h at the outer diameter side of the recessed groove 24e, the foreign matter sinks into the recessed groove 24e so as not to be in an outer diameter side portion while being between the pressing pieces 21d and the recessed groove 24d.

The recessed groove 24e of the exciting piece 24 is formed by press working with the through hole 24a and the positioning holes 24d, according to the present embodiment. A projection 24g is formed at a tip end side of the recessed groove 24e from the tip end side surface of the exciting piece 24 toward the tip end side. A clutch stopper 25 is provided at a tip end side of the exciting piece 24 in a layered manner while partitioning the exciting piece 24 and the clutch part C. The clutch stopper 25 comprises a through hole 25a that is opened to have the same diameter as that of the through hole 24a of the exciting piece 24; and a positioning groove 25b that is formed to be a ring shape on a base end side surface, as shown in FIGS. 11A and 11B. The exciting piece 24 is incorporated such that the projection 24g of the exciting piece 24 is fit into the positioning groove 25b. Accordingly, when the exciting coil unit 16, to which the exciting piece 24 is caulked, is incorporated into the clutch stopper 25, the exciting coil unit 16 can be incorporated while being positioned radially.

In the above-described second embodiment, even if foreign matter enters between the pressing pieces 21d and the exciting piece 24, the foreign matter is into the recessed groove 24e. The groove width H and the groove depth R2 of the recessed groove 24e are greater than the outer diameter R of the foreign matter that can enter the electromagnetic controller E side, allowing the foreign matter to sink into the recessed groove 24e. In other words, the sunken foreign matter does not project from the recessed groove 24e. Accordingly, the pressing pieces 21d are prevented from being deformed by the foreign matter even if the pressing pieces 21d are displaced while being pressed against the exciting piece base end side surface 24b. The pressing pieces 21d can thus be reliably protected.

Even if the pressing pieces 21d are pushed toward a side of the exciting piece 24, the pressing pieces 21d are not allowed to sink into the recessed groove 24e, as the inner diameter side end edge portions 21f of the pressing pieces 21d abut against the groove edge 24f on the inner diameter side of the recessed groove 24e. The first plunger unit 18 can reliable be urged into a non-acting posture because the pressing pieces 21d can maintain a spring feature. Accordingly, the third spring 21 can maintain its function, and the reliability can be further improved.

In addition, the projection 24g is formed on the tip end side surface of the exciting piece 24 when the recessed groove 24e is formed on the exciting piece 24. The projection 24g is fit into the positioning groove 25b that is formed on the clutch stopper 25 that is layered at the tip end side of the exciting piece 24. Accordingly, the exciting coil unit 16 can be incorporated into the clutch stopper 25 while being highly accurately positioned.

The present invention provides an electric component provided with an electromagnetic controller applicable to a uniaxial engine starter and the like that starts an internal combustion of a vehicle and the like.

The invention claimed is:

1. An engine starter comprising:
a motor unit;
a drive shaft that rotates under a motor unit driving force;
a pinion gear that spline-fits to the drive shaft; and
an electromagnetic controller that is fit onto the drive shaft, the electromagnetic controller connecting the motor unit with a battery power supply and allowing the pinion gear to be displaced toward a tip end side so as to be engaged with a ring gear at an engine side, wherein:
the electromagnetic controller includes:
an exciting coil unit that is provided with a coil main body and an exciting piece that is positioned at a tip end side of the coil main body so as to be magnetized according to an excitation of the coil main body; and
a plunger that is disposed in a ring-shaped space formed at an inner diameter side of the exciting coil unit so as to be movable in the ring-shaped space in an axial center direction, the plunger being displaceable from a non-acting position to an acting position at a tip end side under an attracting force based on magnetization of the exciting piece, wherein:
an urging member is provided at the inner diameter side of the exciting coil unit so as to urge the plunger to a side of the non-acting position according to demagnetization of the exciting piece,
the urging member is formed to be a ring-shaped plate, and
an urging part of the urging member at an inner diameter side urges a tip end face of the plunger, the urging part including a pressing piece that is notched long at a plurality of positions in a circumferential direction and bent toward the plunger.

2. The engine starter according to claim 1, wherein the plunger comprises:
a first plunger unit that switches a connection between the motor unit and the battery power supply that is provided along an inner peripheral surface of the exciting coil unit; and
a second plunger unit that is positioned at an inner diameter side of the first plunger unit and displaces the pinion gear, wherein:
the urging member urges the first plunger unit at an outer diameter side toward the non-acting position,
the exciting piece is formed to be a disk shape that projects toward the inner diameter side rather than the inner peripheral surface of the exciting coil unit,
a second plunger main body is provided on the second plunger unit at an inner diameter side so as to be attracted by the exciting piece that is magnetized on an outer peripheral surface,
a cylindrical part is formed so as to extend toward a tip end side of the exciting piece through a through hole of the exciting piece when the second plunger unit is displaced to the acting position,
a ring-shaped recessed groove is formed in the exciting piece and positioned at a portion opposed to an urging part of the urging member, and
a groove depth and width of the recessed groove is greater than an intervening space between an outer peripheral surface of the cylindrical part of the second plunger unit at the acting position and the exciting piece through hole.

3. An electromagnetic controller comprising:
a coil main body and an exciting coil unit that is provided with a coil main body and an exciting piece that is positioned at a tip end side of the coil main body so as to be magnetized according to an excitation of the coil main body; and
a plunger that is disposed in a ring-shaped space formed at an inner diameter side of the exciting coil unit so as to be movable in the ring-shaped space in an axial center direction, the plunger being displaceable from a non-acting position to an acting position at a tip end side under an attracting force based on magnetization of the exciting piece, wherein:
an urging member is provided at the inner diameter side of the exciting coil unit so as to urge the plunger to a side of the non-acting position according to demagnetization of the exciting piece, and
the urging member is formed to be a ring-shaped plate, and an urging part of the urging member at an inner diameter side urges a tip end face of the plunger, the urging part including a pressing piece that is notched long at a plurality of positions in a circumferential direction and bent toward the plunger.

4. The electromagnetic controller according to claim 1, wherein the plunger comprises:
a first plunger unit; and
a second plunger unit that is positioned at an inner diameter side of the first plunger unit, wherein:
the urging member urges the first plunger unit at an outer diameter side toward the non-acting position,
the exciting piece is formed to be a disk shape that projects toward the inner diameter side rather than the inner peripheral surface of the exciting coil unit,
a second plunger main body is provided on the second plunger unit at an inner diameter side so as to be attracted by the exciting piece that is magnetized on an outer peripheral surface,
a cylindrical part is formed so as to extend toward a tip end side of the exciting piece through a through hole of the exciting piece when the second plunger unit is displaced to the acting position,
a ring-shaped recessed groove is formed in the exciting piece and positioned at a portion opposed to an urging part of the urging member, and
a groove depth and width of the recessed groove is greater than an intervening space between an outer peripheral surface of the cylindrical part of the second plunger unit at the acting position and the exciting piece through hole.

* * * * *